United States Patent
Kumar et al.

(10) Patent No.: US 11,046,243 B2
(45) Date of Patent: Jun. 29, 2021

(54) VISUAL SPEED INDICATION DEVICE FOR MOTOR VEHICLES AND METHOD THEREOF

(71) Applicant: WIPRO LIMITED, Bangalore (IN)

(72) Inventors: Vijay Kumar, Bangalore (IN); Thomas Chittakattu Ninan, Angadikadavu (IN); Shagun Rai, Allahabad (IN)

(73) Assignee: Wipro Limited, Bangalore (IN)

(*) Notice: Subject to any disclaimer, the term of this patent is extended or adjusted under 35 U.S.C. 154(b) by 770 days.

(21) Appl. No.: 15/860,899

(22) Filed: Jan. 3, 2018

(65) Prior Publication Data
US 2019/0152383 A1    May 23, 2019

(30) Foreign Application Priority Data
Nov. 21, 2017    (IN) .............................. 201741041676

(51) Int. Cl.
| | |
|---|---|
| B60Q 1/54 | (2006.01) |
| G01P 1/07 | (2006.01) |
| G01D 7/00 | (2006.01) |
| C09D 5/26 | (2006.01) |
| G01P 1/08 | (2006.01) |
| G01P 1/10 | (2006.01) |
| G01K 11/12 | (2021.01) |

(52) U.S. Cl.
CPC .................. *B60Q 1/54* (2013.01); *C09D 5/26* (2013.01); *G01D 7/005* (2013.01); *G01P 1/07* (2013.01); *G01P 1/08* (2013.01); *G01P 1/10* (2013.01); *G01K 11/12* (2013.01)

(58) Field of Classification Search
CPC .... B60Q 1/54; C09D 5/26; G01P 1/08; G01P 1/10; G01P 1/07; G01D 7/005; G01K 11/12
See application file for complete search history.

(56) References Cited

U.S. PATENT DOCUMENTS

3,516,185 A * 6/1970 Hilborn ..................... G09F 9/30
                                                                    40/448
3,874,240 A * 4/1975 Rembaum ................ B41M 5/30
                                                                    374/162
(Continued)

*Primary Examiner* — Nimeshkumar D Patel
*Assistant Examiner* — Tania Courson
(74) *Attorney, Agent, or Firm* — Finnegan, Henderson, Farabow, Garrett & Dunner, LLP (57) ABSTRACT

This disclosure relates generally to motor vehicles, and more particularly to motor vehicle and device for visually indicating a speed of the motor vehicle, and method thereof. In one embodiment, a method is provided for visually indicating a speed of a motor vehicle. The method includes receiving an instantaneous speed of the motor vehicle from one or more odometry devices of the motor vehicle and an instantaneous temperature on an external surface of the motor vehicle from one or more temperature sensors. The method further includes configuring one or more thermoelectric couple strips to regulate temperatures of one or more corresponding thermochromic paint coating layers disposed on the external surface of the motor vehicle, based on the instantaneous speed and the instantaneous temperature, to dynamically control indication of a color pattern associated with a range of instantaneous speed of the motor vehicle.

15 Claims, 4 Drawing Sheets

(56) References Cited

U.S. PATENT DOCUMENTS

| | | | | |
|---|---|---|---|---|
| 4,142,782 A * | 3/1979 | O'Brian | | G02F 1/0147 359/288 |
| 4,837,071 A * | 6/1989 | Tagoku | | B41M 5/363 428/187 |
| 4,917,643 A * | 4/1990 | Hippely | | A63H 17/26 106/31.16 |
| 4,922,242 A * | 5/1990 | Parker | | G02F 1/0147 345/106 |
| 5,085,607 A * | 2/1992 | Shibahashi | | A63H 33/22 106/31.16 |
| 5,202,677 A * | 4/1993 | Parker | | G02F 1/0147 349/161 |
| 5,316,513 A * | 5/1994 | Nakagawa | | A63H 3/36 428/31 |
| 5,503,583 A * | 4/1996 | Hippely | | A63H 17/26 446/14 |
| 5,709,454 A * | 1/1998 | Hatlestad, II | | B60Q 1/30 362/496 |
| 5,721,059 A * | 2/1998 | Kito | | C08K 5/0008 252/583 |
| 5,805,245 A * | 9/1998 | Davis | | G02F 1/132 349/185 |
| 5,854,614 A * | 12/1998 | Larson | | G02F 1/0147 345/90 |
| 6,278,430 B1 * | 8/2001 | Larson | | G02F 1/0147 345/106 |
| 6,500,555 B1 * | 12/2002 | Khaldi | | B32B 7/02 428/457 |
| 6,706,218 B2 * | 3/2004 | Lucht | | C08G 61/126 116/201 |
| 7,278,369 B2 * | 10/2007 | Kelley | | B60C 13/001 116/216 |
| 7,957,054 B1 * | 6/2011 | Yeo | | G02B 26/004 359/296 |
| 8,128,450 B2 * | 3/2012 | Imai | | A63H 17/004 446/14 |
| 9,481,367 B1 | 11/2016 | Gordon et al. | | |
| 9,499,209 B1 * | 11/2016 | Frank | | B60R 13/08 |
| 9,778,534 B2 * | 10/2017 | Tran | | G02F 1/1525 |
| 10,184,840 B2 * | 1/2019 | Safai | | G01J 5/28 |
| 10,493,825 B2 * | 12/2019 | Woodrow | | G02F 1/153 |
| 10,603,988 B2 * | 3/2020 | O'Keeffe | | B60J 3/04 |
| 10,768,447 B2 * | 9/2020 | Blum | | G02C 11/08 |
| 2003/0036747 A1 * | 2/2003 | Ie | | A61B 17/00 606/1 |
| 2003/0087580 A1 * | 5/2003 | Shibahashi | | A63H 33/22 446/14 |
| 2005/0087725 A1 * | 4/2005 | Kanakkanatt | | B60C 23/20 252/408.1 |
| 2006/0116442 A1 * | 6/2006 | Gallo | | C09D 5/26 523/200 |
| 2013/0321627 A1 | 12/2013 | Turn, Jr. et al. | | |
| 2015/0296565 A1 * | 10/2015 | Apdalhaliem | | B64C 1/1484 219/203 |
| 2016/0167648 A1 | 6/2016 | James et al. | | |
| 2019/0086275 A1 * | 3/2019 | Kumar | | A61B 5/1112 |
| 2019/0137841 A1 * | 5/2019 | Koo | | G09G 3/19 |
| 2019/0322129 A1 * | 10/2019 | Lee | | G02F 1/1503 |
| 2019/0358937 A1 * | 11/2019 | Shouhi | | B32B 27/20 |
| 2019/0366811 A1 * | 12/2019 | O'Keeffe | | B60W 40/02 |

\* cited by examiner

VISUAL SPEED INDICATION DEVICE FOR MOTOR VEHICLES AND METHOD THEREOF

TECHNICAL FIELD

This disclosure relates generally to motor vehicles, and more particularly to motor vehicle and device for visually indicating a speed of the motor vehicle, and method thereof.

BACKGROUND

Motor vehicles, including, for example, road vehicles (e.g., cars, motorcycles, bus, etc.), railed vehicles (e.g., train, tram, etc.), water vehicles (boats, etc.), air vehicle (e.g., drones, etc.), and so forth have become ubiquitous in today's world and are used extensively by users in their daily life. It is important to monitor speed of motor vehicles for various reasons, including, for example, law enforcement, insurance calculations, autonomous navigation, collision avoidance, and so forth.

For example, with the advent of autonomous (driverless) vehicles, the roads are expected to be filled with such intelligent vehicles. One of the most important requirements for such vehicles is to accurately determine speed of the approaching vehicles (whether driverless or not), perform calculations, and take preventive and evasive actions. Currently, light detection and ranging (LIDAR) scanners and other such remote sensing systems are employed to accurately determine the speed of the approaching vehicles. However, the range of the LIDAR scanners are limited. Further, LIDAR scanners need time to first illuminate the approaching vehicles and then receive light reflected from the approaching vehicles. Moreover, speed determination techniques, based on displacement data received from LIDAR scanners, need time to perform calculations.

SUMMARY

In one embodiment, a device, for visually indicating a speed of a motor vehicle, is disclosed. In one example, the device includes one or more thermochromic paint coating layers disposed on an external surface of the motor vehicle, wherein each of the one or more thermochromic paint coating layers is indicative of a color based on a variation in a temperature. The device further includes one or more thermoelectric couple strips disposed underneath the corresponding one or more thermochromic paint coating layers and adapted to regulate the temperature of the corresponding one or more thermochromic paint coating layers. The device further includes one or more temperature sensors for sensing an instantaneous temperature on the external surface of the motor vehicle. The device further includes a control unit configured to receive an instantaneous speed of the motor vehicle from one or more odometry devices of the motor vehicle and the instantaneous temperature from the one or more temperature sensors, and to configure the one or more thermoelectric couple strips to regulate temperatures of the one or more corresponding thermochromic paint coating layers, based on the instantaneous speed and the instantaneous temperature, to dynamically control indication of a color pattern associated with a range of instantaneous speed of the motor vehicle.

In one embodiment, a method, for visually indicating a speed of a motor vehicle, is disclosed. In one example, the method includes receiving an instantaneous speed of the motor vehicle from one or more odometry devices of the motor vehicle and an instantaneous temperature on an external surface of the motor vehicle from one or more temperature sensors. The method further includes configuring one or more thermoelectric couple strips to regulate temperatures of one or more corresponding thermochromic paint coating layers disposed on the external surface of the motor vehicle, based on the instantaneous speed and the instantaneous temperature, to dynamically control indication of a color pattern associated with a range of instantaneous speed of the motor vehicle.

In one embodiment, a motor vehicle, for visually indicating its speed, is disclosed. In one example, the motor vehicle includes one or more odometry devices to determine an instantaneous speed of the motor vehicle. The motor vehicle further includes one or more thermochromic paint coating layers disposed on an external surface of the motor vehicle, wherein each of the one or more thermochromic paint coating layers is indicative of a color based on a variation in temperature. The motor vehicle further includes one or more thermoelectric couple strips disposed underneath the corresponding one or more thermochromic paint coating layers and adapted to regulate the temperature of the corresponding one or more thermochromic paint coating layers. The motor vehicle further includes one or more temperature sensors for sensing an instantaneous temperature on the external surface of the motor vehicle. The motor vehicle further includes a control unit configured to receive an instantaneous speed of the motor vehicle from the one or more odometry devices and the instantaneous temperature from the one or more temperature sensors, and to configure the one or more thermoelectric couple strips to regulate temperatures of the one or more corresponding thermochromic paint coating layers, based on the instantaneous speed and the instantaneous temperature, to dynamically control indication of a color pattern associated with a range of instantaneous speed of the motor vehicle.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
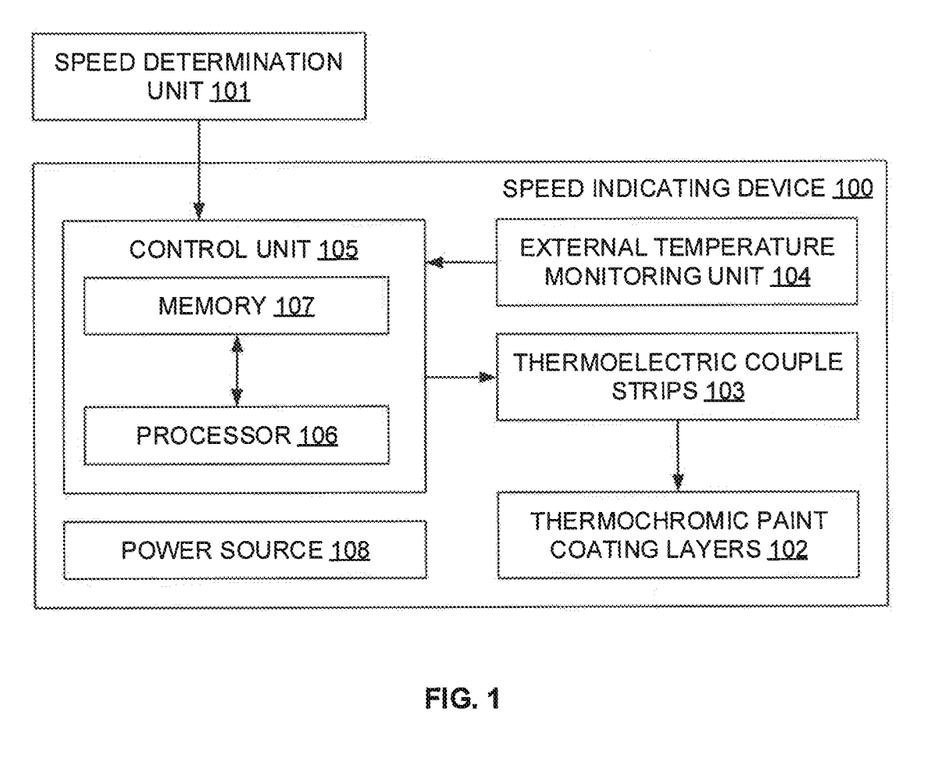
FIG. 1 is a block diagram of an exemplary speed indicating device for visually indicating a speed of the motor vehicle in accordance with some embodiments of the present disclosure.

Referring now to FIG. 1, a block diagram of an exemplary speed indicating device 100 is illustrated in accordance with some embodiments of the present disclosure. The speed indicating device 100 may be employed by a motor vehicle for visually indicating its speed. In some embodiments, the speed indicating device 100 may be an integral part of the motor vehicle. Alternatively, in some embodiments, the speed indicating device 100 may be a separate device that may be fitted on to the motor vehicle. The motor vehicle may include, but is not limited to, a road vehicle (e.g., a car, a motorcycle, a bus, etc.), a railed vehicle (e.g., a train, a tram, etc.), a water vehicle (a boat, a jet ski, etc.), and an air vehicle (e.g., a drone, etc.).

The speed indicating device 100 may visually indicate the speed of the motor vehicle, recorded by the speed determination unit 101 of the motor vehicle, in accordance with some embodiments of the present disclosure. In some embodiments, the speed determination unit 101 may include one or more odometry devices (e.g., speedometer, wheel odometer, etc.) of the motor vehicle. The one or more odometry devices may determine an instantaneous speed of the motor vehicle and may provide information on the determined speed to the speed indicating device 100. In some embodiments, the speed indicating device 100 may include thermochromic paint coating layers 102, thermoelectric couple strips 103, an external temperature monitoring unit 104, a control unit 105, and a power source 106.

Figure 3A:
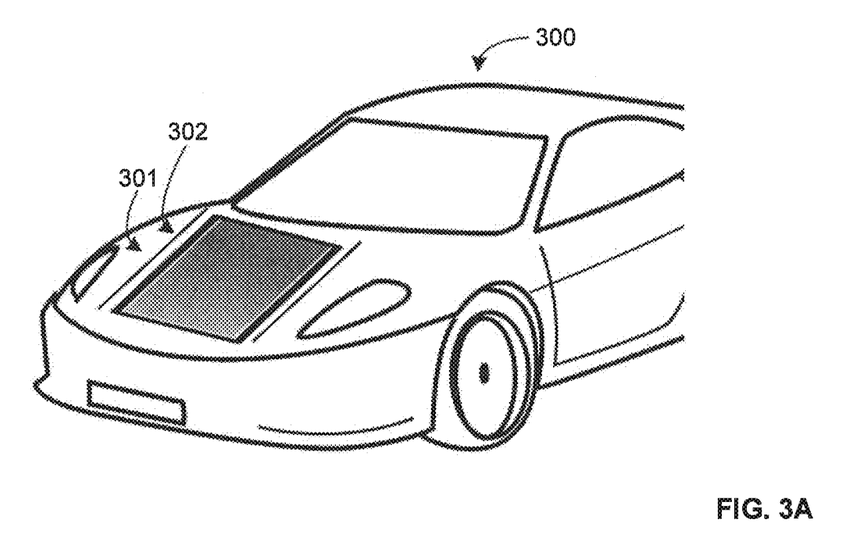
FIGS. 3A and 3B illustrate an exemplary motor vehicle equipped with the speed indicating device of FIG. 1 in accordance with some embodiments of the present disclosure.
Figure 3B:
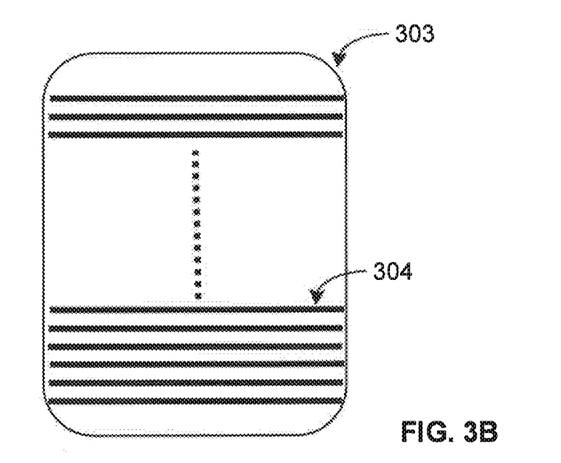

The thermochromic paint coating layers 102 may be disposed or applied on an external surface of the motor vehicle. It should be noted that the external surface should be selected such that it is easily visible by a speed monitoring device from a distance. As will be described in greater detail with reference to FIG. 3, in some embodiments, the thermochromic paint coating layers 102 may be disposed or applied on an external surface of a bonnet of the motor vehicle. A thermochromic paint works on the property of thermochromism. Thermochromism is a property of substances to indicate color at a particular temperature. Thus, the thermochromic paint coating layers 102 may absorb heat and may indicate respective colors. In absence of heat, the thermochromic paint coating layer 202 may remain neutral. In other words, each of the thermochromic paint coating layers 102 may have a property to change its colors based on the amount of heat applied to it. Thus, a thermochromic paint coating layer 102 may indicate a color based on a variation in a temperature. As will be appreciated, each of the thermochromic paint coating layers 102 may be selected so as to emit a particular color at a particular temperature. Each color may indicate a particular speed (e.g., green for speed under 20, blue for speed under 40, yellow for speed under 60, orange for speed under 80, and red for speed over 80, etc.). Further, in some embodiments, thermochromic paint coating layer 102 may be selected so as to indicate a reflective color for night time visibility. Moreover, in some embodiments, a thermal non-conductive layer may be provided between any two thermochromic paint coating layers 102 so as to avoid or minimize any heat dissipation between the two thermochromic paint coating layers 102. Thus, the thermally nonconductive separation layer ensures that a particular thermochromic paint coating layer 102 is not getting effected by the temperature changes occurring at adjacent thermochromic paint coating layers 102.

The thermoelectric couple strips 103 comprising of a number of thermoelectric couples may be disposed underneath the corresponding thermochromic paint coating layers 102. In some embodiments, the thermoelectric couple strips 103 may be disposed on the external surface of the motor vehicle underneath the corresponding thermochromic paint coating layers 102. Alternatively, in some embodiments, the thermoelectric couple strips 103 may be integrated with a part of the motor vehicle where the thermochromic paint coating layers 102 is disposed or applied. Again, as will be described in greater detail with reference to FIG. 3, in some embodiments, the thermoelectric couple strips 103 may be integrated with the bonnet or may be disposed on the external surface of the bonnet underneath the corresponding thermochromic paint coating layers 102. A thermoelectric couple works on the principle of thermoelectric effect. The thermoelectric effect creates a temperature difference by transferring heat between two electrical junctions (not shown in the figure). A voltage is applied across two electrical junctions to create an electric current. When the current flows through the two electrical junctions, heat is dissipated at one junction and the other junction is relatively cooler. For example, the two junctions may be named a first junction and a second junction. In an instance, when the first junction is provided with a positive voltage and the second junction is provided with a negative voltage, temperature of the first junction increases compared to the second junction. In the above-mentioned instance, when the polarity is reversed the first junction dissipates heat towards the second junction thereby getting cooler compared to the second junction. In short, the thermoelectric couple has a property to transfer the heat from one side to other side when a current flows through it. The direction of heat transfer may depend on the direction of current flow. Thus, the thermoelectric couple strips 103 may be adapted to regulate temperature of (i.e., heat transferred to) the thermochromic paint coating layers 102. In particular, the thermoelectric couple strips 103 may receive a voltage from the control unit 105 so as to increase or decrease temperature of the corresponding thermochromic paint coating layers 102. For example, the thermoelectric couple strips 103 may increase or decrease temperatures of the corresponding thermochromic paint coating layers 102, for displaying a color when the instantaneous speed is within a pre-determined range or outside of the pre-determined range.

In some embodiments, the speed indicating device 100 may include a thermal conductive layer disposed between each of the thermoelectric couple strips 103 and the corresponding thermochromic paint coating layers 102 so as to facilitate propagation of heat from the thermoelectric couple strip 103 to the corresponding thermochromic paint coating layer 102. Additionally, in some embodiments, the speed indicating device 100 may include a thermal regulation layer to dissipate heat or absorb heat, from the one or more thermoelectric couple strips 103. In some embodiments, the first junction of the thermoelectric couple may be associated with the corresponding thermochromic paint coating layer while the second junction may be associated with the thermal regulation layer.

The external temperature monitoring unit 104 may record an instantaneous temperature on the thermochromic paint coated surface, and may provide the information on the recorded temperature level to the control unit 105. In some embodiments, the external temperature monitoring unit 104 may include temperature sensors disposed on the thermochromic paint coated surface (i.e., the external surface of the motor vehicle where the thermochromic paint coating layer is disposed or applied).

The control unit 105 may receive the instantaneous speed of the motor vehicle from speed data received from the speed determination unit 101 (i.e., the odometry devices). The control unit 105 may further receive the instantaneous temperature on the external surface of the motor vehicle from the temperature sensors 104. The control unit 105 may then configure the thermoelectric couple strips 103 to regulate temperatures of the corresponding thermochromic paint coating layers 102, based on the instantaneous speed and the instantaneous temperature, to dynamically control indication of a color pattern associated with a range of instantaneous speed of the motor vehicle. Thus, the control unit 105 may activate appropriate thermoelectric couple strips 103 so as to transfer heat to the thermochromic paint coating layers 102. The activation of the appropriate thermoelectric couple strips 103 may be achieved by driving current through the appropriate thermoelectric couple strips 103 using a driving circuitry.

It should be noted that, in some embodiments, the thermoelectric couple strips 103 may be configured to regulate temperatures of the corresponding thermochromic paint coating layers 102 based on the instantaneous speed of the motor vehicle while discounting the effect of instantaneous temperature on the external surface of the motor vehicle. This ensures that any wrong indication due to the effect of other external heat sources such as sun light or running engine may be avoided or discounted.

The control unit 105 may include a processor 106 and a memory 107. The processor 105 may execute various instructions to carry out various system-generated requests and to carry out various functions of the speed indicating device 100. The processor 106 may include, but are not limited to, application-specific integrated circuits (ASICs), digital signal processors (DSPs), Field Programmable Gate Arrays (FPGAs), etc. The memory 107 may store instructions that, when executed by the processor 106, cause the processor 106 to perform various functions of the speed indicating device 100. For example, the memory 107 may store a set of instructions corresponding to various components and modules of the speed indicating device 100. The processor 106 may fetch the instructions from the memory 107, and may execute them to perform various functions of the speed indicating device 100. In some embodiments, the memory 107 may store a set of instructions or algorithms which is executed by the processor 106 to determine speed of the motor vehicle, to determine temperature level of the thermochromic paint coated surface, and to activate appropriate thermoelectric couple strips 103 through the driving circuitry.

The power source 108 provides power to various components of the speed indicating device 100 through an internal or an external power source via a power circuitry. The internal power source may be a fixed or a removal rechargeable battery (e.g., Lithium-ion battery, Nickel metal hydride battery, etc.). The external source may be a direct current source (e.g., battery of the motor vehicle), or a charger adaptor operating from a current source (e.g., power socket provided in the motor vehicle).

Figure 2:
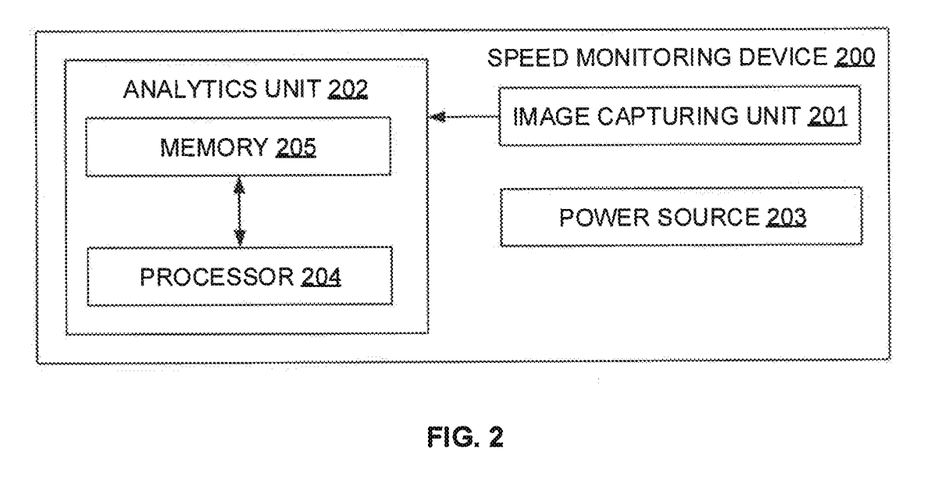
FIG. 2 is a block diagram of an exemplary speed monitoring device for determining a speed of an approaching motor vehicle, visually indicated by the speed indicating device of FIG. 1, in accordance with some embodiments of the present disclosure.

Referring now to FIG. 2, a block diagram of an exemplary speed monitoring device 200 is illustrated in accordance with some embodiments of the present disclosure. The speed monitoring device 200 may be employed to determine a speed of an approaching motor vehicle visually indicated by the speed indicating device 100. As will be appreciated, the speed monitoring device 200 may be employed by a variety of systems, devices, or institutions for a variety of reasons such as law enforcement, insurance calculations, autonomous navigation, collision avoidance, and so forth. For example, the speed monitoring device 200 may be installed on another vehicle for collision detection, warning, and avoidance. In particular, the speed monitoring device 200 may be installed on an autonomous vehicle for autonomous navigation and collision avoidance. It should be noted that the speed monitoring device 200 may be an integral part of the motor vehicle or may be a separately fitted on to the motor vehicle. Additionally, the speed monitoring device 200 may be installed on a hand held device or a fixed structure (e.g., traffic light) of a law enforcement agency for speed monitoring and regulation. The data collected by law enforcement agency may also be used for insurance calculations and other such purposes.

The speed monitoring device 200 may determine the speed of the approaching motor vehicle, visually indicated by the speed indicating device 100 installed on the approaching motor vehicle, in accordance with some embodiments of the present disclosure. In some embodiments, the speed monitoring device 200 may include an image capturing unit 201, an analytics unit 202, and a power source 203. The image capturing unit 201 may include imaging devices (e.g., cameras) installed in such a manner that they capture a number of images of an external surface of the approaching motor vehicle. As will be appreciated, the approaching motor vehicle may be fitted with the speed indicating device 100. Thus, the external surface of the approaching motor vehicle may have the thermochromic paint coating layers applied on to it such that the thermochromic paint coating layers may indicate a color pattern associated with an instantaneous speed of the approaching motor vehicle. The image capturing unit 201 may then provide the captured images to the analytics unit 202.

The analytics unit 202 may receive the captured images from the image capturing unit 201. The analytics unit 202 may then analyze the captured images to identify the indicated color pattern associated with the instantaneous speed of the approaching motor vehicle. The analytics unit 202 may then determine the range of instantaneous speed of the motor vehicle based on the indicated color pattern. The analytics unit 202 may include a processor 204 and a memory 205. The processor 204 may execute various instructions to carry out various system-generated requests and to carry out various functions of the speed monitoring device 200. The processor 204 may include, but are not limited to, application-specific integrated circuits (ASICs), digital signal processors (DSPs), Field Programmable Gate Arrays (FPGAs), etc. The memory 205 may store instructions that, when executed by the processor 204, cause the processor 204 to perform various functions of the speed monitoring device 200. For example, the memory 205 may store a set of instructions corresponding to various components and modules of the speed monitoring device 200. The processor 204 may fetch the instructions from the memory 205, and may execute them to perform various functions of the speed monitoring device 200. In some embodiments, the memory 205 may store a set of instructions or algorithms which is executed by the processor 204 to analyze the captured images and to determine speed of the approaching motor vehicle.

The power source 203 provides power to various components of the speed monitoring device 200 through an internal or an external power source via a power circuitry. The internal power source may be a fixed or a removal rechargeable battery (e.g., Lithium-ion battery, Nickel metal hydride battery, etc.). The external source may be a direct current source (e.g., battery of the motor vehicle), or a charger adaptor operating from a current source (e.g., power socket provided in the motor vehicle).

By way of example, referring now to FIGS. 3A and 3B, an exemplary motor vehicle 300 is illustrated in accordance with some embodiments of the present disclosure. In some embodiments, the motor vehicle 300 may be an autonomous vehicle. The motor vehicle 300 may be equipped with speed indicating device 100. Thus, the bonnet 301 of the motor vehicle 300 may be coated with the thermochromic paint layers 302. Additionally, the thermoelectric couple strips 303 may be integrated with the bonnet 301 or placed underneath the bonnet 301. The thermoelectric couple strips 303 may include a number of thermoelectric couples 304. As discussed above, based on the current speed of the vehicle (as determined by speedometer; odometer, and other odometry devices), the control unit of the speed indicating device 100 may activate specific strips or specific thermoelectric couples 304 of the thermoelectric couple strips 303. The activated strips 304 may heat corresponding thermochromic paint layers 302, thereby effecting a change in color of the corresponding thermochromic paint layers 302. Thus, a portion of the bonnet 301 may be of a different color than the rest of the portion. As will be appreciated, the color pattern of the bonnet 301 caused by unique combination of specific activated strips 304 and remaining non-activated strip 304) may be unique to a range of instantaneous speed of the motor vehicle 300.

By way of another example, another exemplary motor vehicle in front of the motor vehicle 300 may be equipped with speed monitoring device 200 in accordance with some embodiments of the present disclosure. Thus, the rear of the other motor vehicle may be mounted with long range cameras (e.g., with zoom capability) capable of capturing images of the bonnet 301 of the approaching motor vehicle 300. As will be appreciated, the images may include the color pattern formed on the bonnet 301 of the approaching motor vehicle 300 due to the speed of the approaching motor vehicle 300. The analytics unit may then analyze the images and arrive at the speed range of the approaching motor vehicle 300. The motor vehicle in the front may therefore get instantaneous information about the speed of the approaching motor vehicle 300, while the changing color may add a flavor of aesthetic improvement in the approaching motor vehicle 300. As will be appreciated, the determination of the speed of the approaching motor vehicle 300 may be without any delay resulting from need for illumination of the approaching vehicle or need for performing complex computation, typically required by the current LIDAR based techniques.

As stated above, a key limitation in above described technique is wrong indication that may happen due to the effect of external heat sources such as sun light, heat wave, running engine, and so forth. Thus, the speed indicating device 100 has been envisioned with a set of dedicated temperature sensors based feedback unit so as to monitor the instantaneous temperature level on the thermochromic paint coated surface. The temperature feedback may be analyzed by the control unit so that the control unit may accordingly control the thermoelectric couples to maintain the desired temperature level on the thermochromic paint coated surface.

It should be noted that the some of the components (e.g., control unit 105, analytics unit 202, etc.) of the speed indicating device 100 and the speed monitoring device 200 may be implemented in programmable hardware devices such as programmable gate arrays, programmable array logic, programmable logic devices, and so forth. Alternatively, these components may be implemented in software for execution by various types of processors. An identified engine of executable code may, for instance, include one or more physical or logical blocks of computer instructions which may, for instance, be organized as an object, procedure, function, module, or other construct. Nevertheless, the executables of an identified engine need not be physically located together, but may include disparate instructions stored in different locations which, when joined logically together, include the engine and achieve the stated purpose of the engine. Indeed, an engine of executable code could be a single instruction, or many instructions, and may even be distributed over several different code segments, among different applications, and across several memory devices.

As will be appreciated by one skilled in the art, a variety of processes may be employed for visually indicating a speed of the motor vehicle and determining the visually indicated speed. For example, the exemplary motor vehicle 300, the exemplary speed indicating device 100, and the exemplary speed monitoring device 200 may visually indicate the speed of the motor vehicle and may determine the visually indicated speed by the processes discussed herein. In particular, as will be appreciated by those of ordinary skill in the art, control logic and/or automated routines for performing the techniques and steps described herein may be implemented by the motor vehicle 300 and the associated speed indicating device 100 and the speed monitoring device 200, either by hardware, software, or combinations of hardware and software. For example, suitable code may be accessed and executed by the one or more processors on the motor vehicle 300, or the speed indicating device 100, or the speed monitoring device 200 to perform some or all of the techniques described herein. Similarly, application specific integrated circuits (ASICs) configured to perform some or all of the processes described herein may be included in the one or more processors on the motor vehicle 300, or the speed indicating device 100, or the speed monitoring device 200.

Figure 4:
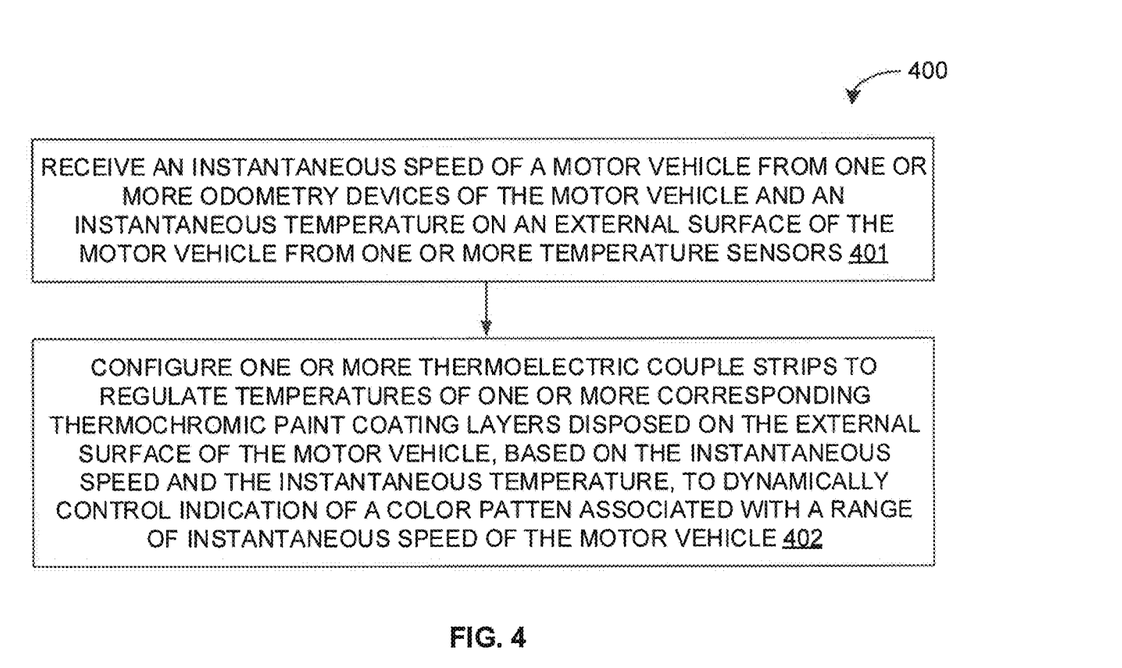
FIG. 4 is a flow diagram of an exemplary process for visually indicating a speed of the motor vehicle in accordance with some embodiments of the present disclosure.

For example, referring now to FIG. 4, exemplary control logic 400 for visually indicating a speed of the motor vehicle via a speed indicating device, such as device 100, is depicted via a flowchart in accordance with some embodiments of the present disclosure. As illustrated in the flowchart, the control logic 400 may include the step of receiving an instantaneous speed of the motor vehicle from one or more odometry devices of the motor vehicle and an instantaneous temperature on an external surface of the motor vehicle from one or more temperature sensors at step 401. The control logic 400 may further include the step of configuring one or more thermoelectric couple strips to regulate temperatures of one or more corresponding thermochromic paint coating layers disposed on the external surface of the motor vehicle, based on the instantaneous speed and the instantaneous temperature, to dynamically control indication of a color pattern associated with a range of instantaneous speed of the motor vehicle at step 402. In some embodiments, configuring the one or more thermoelectric couple strips may include configuring the one or more thermoelectric couple strips to regulate temperatures of the one or more corresponding thermochromic paint coating layers based on the instantaneous speed while discounting the effect of instantaneous temperature which might be as a result of external factors like engine heat, heat wave or sunlight.

It should be noted that each of the one or more thermochromic paint coating layers may indicative of a color based on a variation in a temperature. Additionally, it should be noted that the one or more thermoelectric couple strips may be disposed underneath the corresponding one or more thermochromic paint coating layers, and may be adapted to regulate the temperature of the corresponding one or more thermochromic paint coating layers. In some embodiments, the external surface of the motor vehicle is an external surface of a bonnet of the motor vehicle, and the one or more thermoelectric couple strips are integrated with the bonnet or disposed on the external surface of the bonnet. Further, it should be noted that the one or more thermoelectric couple strips may receive a voltage from the control unit, to increase or decrease temperature of the corresponding one or more thermochromic paint coating layers. As will be appreciated, in some embodiments, the one or more thermoelectric couple strips may increase or decrease temperatures of the corresponding one or more thermochromic paint coating layers so as to display a color when the instantaneous speed is within a pre-determined range or outside of the pre-determined range.

In some embodiments, a thermal conductive layer may be disposed between each of the one or more thermoelectric couple strips and each of the corresponding one or more thermochromic paint coating layers for propagation of heat from the one or more thermoelectric couple strips to the corresponding one or more thermochromic paint coating layers. Additionally, in some embodiments, a thermal non-conductive layer may be disposed between a thermochromic paint coating layer and an adjacent thermochromic paint coating layer, for minimizing heat dissipation between the thermochromic paint coating layer and the adjacent thermochromic paint coating layer. Further, in some embodiments, a thermal regulation layer may be included to dissipate heat or absorb heat, from the one or more thermoelectric couple strips.

In some embodiments, the control logic 400 may further include the steps of capturing one or more images of the external surface of the motor vehicle with one or more imaging devices, and analyzing the one or more images to determine the range of instantaneous speed of the motor vehicle based on the indicated color pattern. It should be noted that the one or more imaging devices and the analytics unit may be part of a speed monitoring device. Further, in some embodiments, the speed monitoring device may be installed on at least one of another motor vehicle, a hand held device, or a fixed structure.

Figure 5:
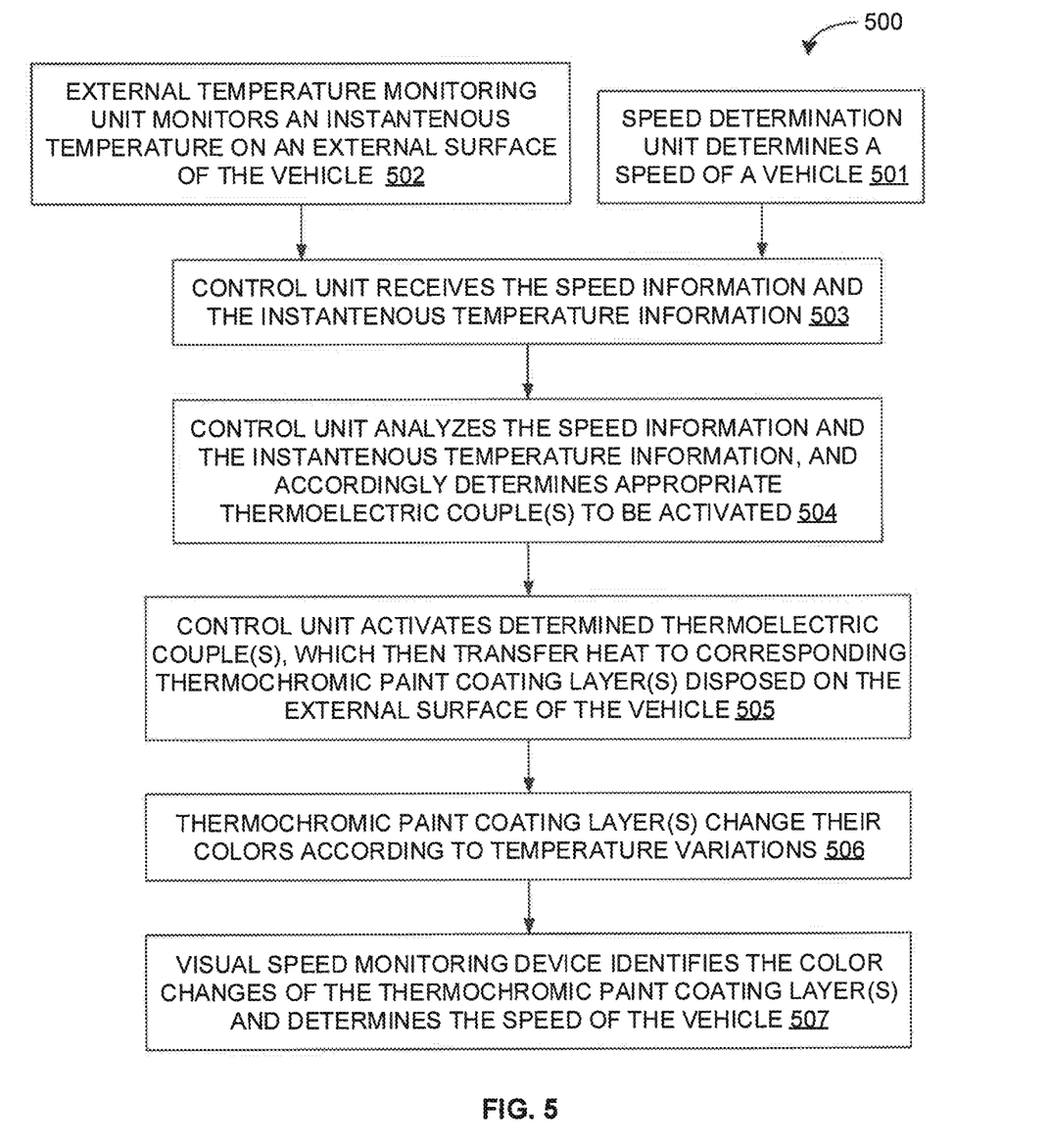
FIG. 5 is a flow diagram of a detailed exemplary process for visually indicating a speed of the motor vehicle and for determining the visually indicated speed, in accordance with some embodiments of the present disclosure.

Referring now to FIG. 5, a detailed exemplary control logic 500 implemented by the speed indicating device 100 for visually indicating a speed of the motor vehicle and speed monitoring device 200 for determining the visually indicated speed is depicted via a flowchart in accordance with some embodiments of the present disclosure. As illustrated in the flowchart, at step 501, the speed determination unit may determine an instantaneous speed (i.e., a current speed) of a motor vehicle, and may send speed information to the control unit. Further, at step 502, the external temperature monitoring unit may monitor an instantaneous temperature on an external surface of the vehicle, and may send the temperature information to the control unit. At step 503, the control unit may receive the instantaneous speed information and the instantaneous temperature information from the speed determination unit and the external temperature monitoring unit respectively.

At step 504, the control unit may analyze the instantaneous speed information and the instantaneous temperature information, and may accordingly determine appropriate thermoelectric couples to be activated. Further, at step 505, the control unit may activate determined thermoelectric couples, which may then transfer heat to corresponding thermochromic paint coating layers disposed on the external surface of the vehicle. Upon activation, current flows through the determined thermoelectric couples and they get heated. The heated thermoelectric couples may then transfer heat to corresponding thermochromic paint coating layers. At step 506, the thermochromic paint coating layers may change their colors according to temperature variations. The heat transfer to the thermochromic paint coating layers may result in temperature variations in the thermochromic paint coating layers, which in turn may result in appropriate change in colors of the thermochromic paint coating layers.

At step 507, another motor vehicle or another device equipped with a visual speed monitoring device may capture the image of the motor vehicle through a mounted imaging device. The analytics unit of the visual speed monitoring device may then identify the color changes of the thermochromic paint coating layers disposed on the external surface of the vehicle, and may determine the speed of the motor vehicle based on the color changes. As will be appreciated, there may be a pre-defined standard relating particular colors or color patterns to particular range of speeds. The color or color pattern identified by the analytics unit of the visual speed monitoring device may be compared to this predefined standard to determine the speed or range of speed of the motor vehicle.

As will be also appreciated, at least a portion of the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Further, as will be appreciated by those skilled in the art, the techniques described in the various embodiments discussed above provide for efficient and effective mechanism for determination of a speed of an approaching vehicle based on visual indication. In particular, the techniques provide for determination of the speed of the approaching vehicle by detecting a change in color or color pattern of the thermochromic paint coated surface (e.g., bonnet) of the approaching vehicle. Additionally, the techniques provide for monitoring the instantaneous temperature level on the thermochromic paint coated surface and accounting for the same, thereby reducing or eliminating any error caused by external heat.

Further, as will be appreciated by those skilled in the art, the determination of speed, using the techniques described in the various embodiments discussed above, is almost instantaneous without any delay resulting from need for illumination of the approaching vehicle or need for performing complex computation, typically required by the current LIDAR based techniques. Thus, in one exemplary application, the techniques result in improving the efficiency of autonomous vehicles in determining the speed of the approaching vehicles, thereby improving autonomous navigation and collision avoidance.

The specification has described motor vehicle and devices for visually indicating a speed of the motor vehicle and for determining visually indicated speed, and methods thereof. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A device for visually indicating a speed of a motor vehicle, the device comprising:
   one or more thermochromic paint coating layers disposed on an external surface of the motor vehicle, wherein each of the one or more thermochromic paint coating layers is indicative of a color based on a variation in a temperature;
   one or more thermoelectric couple strips disposed underneath the corresponding one or more thermochromic paint coating layers and adapted to regulate the temperature of the corresponding one or more thermochromic paint coating layers;
   one or more temperature sensors for sensing an instantaneous temperature on the external surface of the motor vehicle; and
   a control unit configured to:
   receive an instantaneous speed of the motor vehicle from one or more odometry devices of the motor vehicle and the instantaneous temperature from the one or more temperature sensors; and
   configure the one or more thermoelectric couple strips to regulate temperatures of the one or more corresponding thermochromic paint coating layers, based on the instantaneous speed and the instantaneous temperature, to dynamically control indication of a color pattern associated with a range of instantaneous speed of the motor vehicle, wherein configuring the one or more thermoelectric couple strips comprises configuring the one or more thermoelectric couple strips to regulate temperatures of the one or more corresponding thermochromic paint coating layers based on the instantaneous speed while discounting the effect of instantaneous temperature.

2. The device of claim 1, further comprising a thermal conductive layer between each of the one or more thermoelectric couple strips and each of the corresponding one or more thermochromic paint coating layers for propagation of heat from the one or more thermoelectric couple strips to the corresponding one or more thermochromic paint coating layers.

3. The device of claim 1, further comprising a thermal non-conductive layer between a thermochromic paint coating layer and an adjacent thermochromic paint coating layer, for minimizing heat dissipation between the thermochromic paint coating layer and the adjacent thermochromic paint coating layer.

4. The device of claim 1, wherein the one or more thermoelectric couple strips receive a voltage from the control unit, to increase or decrease temperature of the corresponding one or more thermochromic paint coating layers.

5. The device of claim 1, wherein the one or more thermoelectric couple strips increase or decrease temperatures of the corresponding one or more thermochromic paint coating layers, to display a color when the instantaneous speed is within a pre-determined range or outside of the pre-determined range.

6. The device of claim 1, further comprising a thermal regulation layer to dissipate heat or absorb heat, from the one or more thermoelectric couple strips.

7. The device of claim 1, wherein the external surface of the motor vehicle is an external surface of a bonnet of the motor vehicle, and wherein the one or more thermoelectric couple strips are integrated with the bonnet or disposed on the external surface of the bonnet.

8. The device of claim 1, wherein one or more images of the external surface of the motor vehicle are captured by one or more imaging devices, and wherein the one or more images are analyzed by an analytics unit to determine the range of instantaneous speed of the motor vehicle based on the indicated color pattern.

9. The device of claim 8, wherein the one or more imaging devices and the analytics unit are components of a speed monitoring device installed on at least one of another motor vehicle, a hand held device, or a fixed structure.

10. A method of visually indicating a speed of a motor vehicle, the method comprising:
    receiving, by a control unit of a speed indicating device, an instantaneous speed of the motor vehicle from one or more odometry devices of the motor vehicle and an instantaneous temperature on an external surface of the motor vehicle from one or more temperature sensors; and configuring, by the control unit, one or more thermoelectric couple strips to regulate temperatures of one or more corresponding thermochromic paint coating layers disposed on the external surface of the motor vehicle, based on the instantaneous speed and the instantaneous temperature, to dynamically control indication of a color pattern associated with a range of instantaneous speed of the motor vehicle, wherein configuring the one or more thermoelectric couple strips comprises configuring the one or more thermoelectric couple strips to regulate temperatures of the one or more corresponding thermochromic paint coating layers based on the instantaneous speed while discounting the effect of instantaneous temperature.

11. The method of claim 10, wherein the one or more thermoelectric couple strips increase or decrease temperatures of the corresponding one or more thermochromic paint coating layers, for displaying a color when the instantaneous speed is within a pre-determined range or outside of the pre-determined range.

12. The method of claim 10, further comprising:

capturing one or more images of the external surface of the motor vehicle with one or more imaging devices; and analyzing the one or more images to determine the range of instantaneous speed of the motor vehicle based on the indicated color pattern.

13. A motor vehicle for visually indicating its speed, the motor vehicle comprising:

one or more odometry devices to determine an instantaneous speed of the motor vehicle;

one or more thermochromic paint coating layers disposed on an external surface of the motor vehicle, wherein each of the one or more thermochromic paint coating layers is indicative of a color based on a variation in a temperature;

one or more thermoelectric couple strips disposed underneath the corresponding one or more thermochromic paint coating layers and adapted to regulate the temperature of the corresponding one or more thermochromic paint coating layers;

one or more temperature sensors for sensing an instantaneous temperature on the external surface of the motor vehicle; and a control unit configured to:

receive an instantaneous speed of the motor vehicle from the one or more odometry devices and the instantaneous temperature from the one or more temperature sensors; and configure the one or more thermoelectric couple strips to regulate temperatures of the one or more corresponding thermochromic paint coating layers, based on the instantaneous speed and the instantaneous temperature, to dynamically control indication of a color pattern associated with a range of instantaneous speed of the motor vehicle, wherein configuring the one or more thermoelectric couple strips comprises configuring the one or more thermoelectric couple strips to regulate temperatures of the one or more corresponding thermochromic paint coating layers based on the instantaneous speed while discounting the effect of instantaneous temperature.

14. The motor vehicle of claim 13, wherein the external surface of the motor vehicle is an external surface of a bonnet of the motor vehicle, and wherein the one or more thermoelectric couple strips are integrated with the bonnet or disposed on the external surface of the bonnet.

15. The motor vehicle of claim 13, further comprising:

one or more imaging devices for capturing one or more images of an external surface of another motor vehicle; and an analytics unit for analyzing the one or more images to determine the range of instantaneous speed of the another motor vehicle based on the color pattern indicated on an external surface of the another motor vehicle.

* * * * *